United States Patent [19]

Jeppe et al.

[11] Patent Number: 5,251,736
[45] Date of Patent: Oct. 12, 1993

[54] CLUTCH PLATE FOR A MOTOR VEHICLE FRICTION CLUTCH

[75] Inventors: Harald Jeppe, Schweinfurt; Matthias Fischer, Eltingshausen; Martin Langfeldt, Schweinfurt; Peter Schultes, Niederwerrn; Winfried Feller, Gerolzhofen, all of Fed. Rep. of Germany

[73] Assignee: Fichtel & Sachs AG, Schweinfurt, Fed. Rep. of Germany

[21] Appl. No.: 987,165

[22] Filed: Dec. 8, 1992

[30] Foreign Application Priority Data

Dec. 10, 1991 [DE] Fed. Rep. of Germany ....... 4140643

[51] Int. Cl.⁵ .................. F16D 3/14; F16D 3/66
[52] U.S. Cl. .............. 192/106.2; 192/106.1; 192/70.18; 464/68
[58] Field of Search ........... 192/106.2, 106.1, 70.18; 464/68

[56] References Cited

U.S. PATENT DOCUMENTS

| | | | |
|---|---|---|---|
| 4,537,296 | 8/1985 | Lech, Jr. et al. | 192/106.2 |
| 4,549,641 | 10/1985 | Ootani et al. | 192/106.2 |
| 4,577,743 | 3/1986 | Raab et al. | 192/106.2 |
| 4,635,780 | 1/1987 | Wiggen | 192/106.2 |
| 4,651,859 | 3/1987 | Frantz et al. | 192/106.2 |
| 4,655,336 | 4/1987 | Caspar et al. | 192/106.2 |
| 4,684,007 | 8/1987 | Maucher | 192/106.2 |
| 4,726,454 | 2/1988 | Aiki | 192/106.2 |
| 4,763,767 | 8/1988 | Lanzarini et al. | 192/106.2 |
| 4,890,712 | 1/1990 | Maucher et al. | 192/106.2 |
| 4,899,862 | 2/1990 | Graton et al. | 192/106.2 |
| 4,998,608 | 3/1991 | Raab et al. | 192/106.2 |
| 5,014,842 | 5/1991 | Graton et al. | 192/106.2 |
| 5,016,744 | 5/1991 | Fischer et al. | 192/106.2 |
| 5,117,959 | 6/1992 | Graton | 192/106.2 |
| 5,169,357 | 12/1992 | Graton | 464/68 |

Primary Examiner—Leslie A. Braun
Assistant Examiner—Andrea Pitts
Attorney, Agent, or Firm—Brumbaugh, Graves, Donohue & Raymond

[57] ABSTRACT

A clutch plate for a motor vehicle friction clutch is proposed in which a lateral disc of a load torsional vibration damper of the clutch plate is radially centered on spring tongues which extend and project either axially or peripherally from a hub of the clutch plate. The spring tongues extend into a central opening in the lateral disc, and the spring tongues rest in the central opening under radial tension. Radially acting stops on the hub can be provided peripherally between the individual spring tongues to limit the spring travel.

8 Claims, 4 Drawing Sheets

CLUTCH PLATE FOR A MOTOR VEHICLE FRICTION CLUTCH

BACKGROUND OF THE INVENTION

The invention relates to a clutch plate for a motor vehicle friction clutch.

A clutch plate for a motor vehicle friction clutch is known from DE-A-33 40 896 (U.S. Pat. No. 4,635,780), of which the hub non-rotatably carries a hub disc and in which two lateral discs are rigidly connected to one another and are rotatably arranged axially on either side of the hub disc. The lateral discs are torsionally elastically coupled to the hub disc via springs. One of the lateral discs carries clutch friction linings. The hub engages in central openings in the two lateral discs and, on one of the two lateral discs, is radially guided by a ring which is arranged axially between this lateral disc and the hub disc and engages with axially projecting spring tongues in an annular gap between the hub and the central opening in one lateral disc.

SUMMARY OF THE INVENTION

The invention provides a clutch plate in which fewer individual parts are required to center the lateral discs on the hub and which may be assembled more simply than clutch plates known hitherto.

The invention is based on a clutch plate for a motor vehicle friction clutch comprising the following features:

a hub which is concentric to an axis of rotation, a hub disc which is connected, in particular with limited rotational play, to the hub, lateral discs which are arranged axially on either side of the hub disc, are rigidly connected to one another, are rotatable relative to the hub disc and of which at least one of the two lateral discs has a central opening into which there axially extends a guide region of the hub which is concentric to the axis of rotation and radially guides this lateral disc, a plurality of springs torsionally and elastically coupling the two lateral discs to the hub disc and clutch friction linings held on one of the two lateral discs.

The improvement of the invention resides in the fact that the guide region of the hub has a plurality of radially resilient spring tongues which are distributed in the peripheral direction of the hub and are rigidly connected to the hub, and which extend into the central opening in one of the lateral discs and rest there under radial pretension on the lateral disc.

Because the spring tongues are integral and are distributed peripherally on the hub and are subjected to a radial tension due to prestressing, the lateral discs may be elastically centered on the hub without additional components. Therefore, both the lateral discs designed, for example, as covering plates and the hub may be produced with relatively great tolerances. As the components are guided radially and elastically on one another, alignment errors between the internal combustion engine and the motor vehicle transmission can be compensated at this point. At the same time, the components involved in elastic centering serve to produce basic friction in the torsional vibration damper integrated into the clutch plate.

According to a further feature of the invention, the maximum spring travel between the lateral disc and the hub is limited by rigid stops provided on the hub. The stops have a smaller average diameter than the central opening in one of the lateral discs. Beyond the spring travel determined by the spring the stops, the rigidity of which depends on the material used, on the one hand, protects the spring tongues from overloading and, on the other hand, allows a spring characteristic which is very flat in its initial region, i.e. produces only small, slightly varying spring forces when slightly deflected.

In a particularly simple design, it is proposed that the stops be part of the spring tongues. However, it is also possible to arrange the stops independently of the spring tongues, i.e. peripherally spaced from and between the spring tongues. In this way, these components may be designed independently of one another.

In a first embodiment, the spring tongues extend substantially axially. Particularly good centering may be achieved in this way.

In a second embodiment, the spring tongues are bent in the form of an arc and extend peripherally. Relatively great spring travel is permitted in this embodiment.

A further variation proposes that the spring tongues be connected to the hub at their two ends and be radially outwardly and resiliently curved in their central regions. This embodiment has particularly good properties of strength and the spring characteristic may be markedly progressive in design.

In another advantageous embodiment, one end of the spring tongues are rigidly connected to the hub while the other end is left radially, free and resilient. Such an arrangement is particularly compact and allows sufficiently great spring travel.

With a clutch plate in which the hub disc is arranged with to allow limited rotational play on the hub via a set of teeth and a further hub disc for an idling vibration damper is provided axially next to the set of teeth, the hub including the set of teeth and the hub disc of the idling vibration damper, is produced completely as a plastics moulding. A relatively complicated component of this type can therefore be produced easily as machining is unnecessary. At the same time, the spring tongues may also be provided integrally on the moulding.

In a variation, the hub may be designed as a composite moulding consisting of a plastics moulding into which a preformed metal part is inserted. The metal part comprises at least the above-described set of teeth for positioning of the hub disc while the other hub disc is shaped on the plastics moulding. This arrangement is suitable for applications in which the set of teeth is particularly highly stressed. The metallic part may be produced exactly as such and is then preferably inserted during production of the plastics moulding. The spring tongues are preferably shaped integrally on the metal moulding forming the set of teeth.

The spring tongues are preferably provided with a thread-in bevel at their region facing the central opening of the lateral disc. The assembly of lateral disc and hub may be substantially simplified in this way as the spring tongues may be axially inserted without difficulty into the opening in the lateral disc.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
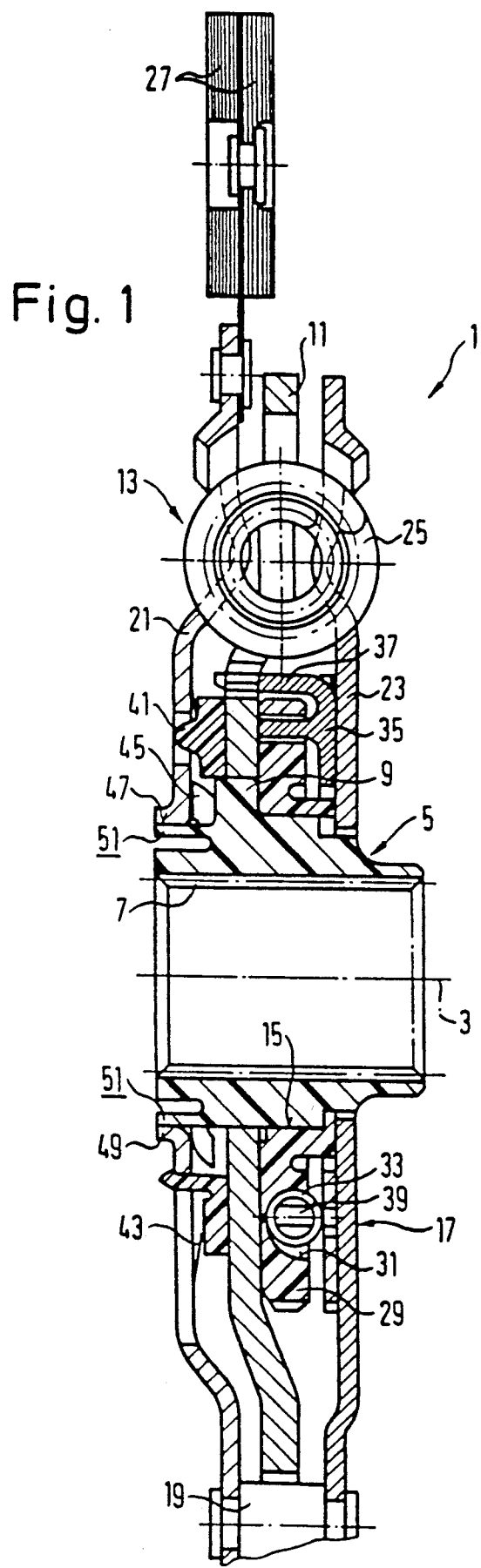
FIG. 1 is an axial longitudinal section view of a clutch plate.

FIG. 1 shows a clutch plate 1 of which the individual parts are arranged concentrically to an axis of rotation 3. A hub 5 designed as a plastics moulding has, in its internal opening, an internal set of teeth 7 for non-rotatable positioning on a transmission input shaft not shown in detail. Radially outwardly, the hub 5 is provided with teeth 9 into which a hub disc 11 of a load torsional vibration damper of the clutch-plate, generally designated by 13, engages with limited rotational play, determining the range of action of an idling torsional vibration damper 17 described in detail hereinafter, by means of a set of teeth 15. Spaced lateral discs 21 and 23 rigidly connected to one another by rivets 19, are arranged rotatably relative to the hub 5 axially on either side of the hub disc 11. The lateral discs 21 and 23 are torsionally elastically coupled to the hub disc 11 by helical springs 25, one end of which is seated in apertures in the lateral disc 21 and 23, and the other end of which is seated in the hub disc 11 on the other hand. The lateral disc 21 additionally carries clutch friction linings 27.

A hub disc 29 of the idling torsional vibration damper 17 is non-rotatably positioned on the hub 5 axially next to the teeth 9. The hub disc 29 receives helical springs 33 of the idling damper 17 in recesses 31. A control member 35, which is coupled via projections 37 to the hub disc 11 and via projections 39 to the helical springs 33 of the idling damper 17, is arranged axially next to the hub disc 29 arranged radially inside the region of the helical springs 25.

On the side of the hub disc 11 remote from the control member 35, there is provided a friction ring 41 of a load friction device which rests on the hub disc 11, and is non-rotatably connected to the lateral disc 21, and which is tensioned against the hub disc 11 by a Belleville spring washer 43. The force path of the Belleville spring washer 43 is closed via the other lateral disc 23 and the control member 35 supported via the projections 37 on the hub disc 11.

Radially inside the friction ring 41 there is arranged a spring 45 one end of which rests on the one hand on the interior of the lateral disc 21 and the other end of which on the other hand on the teeth 9 of the hub 5. The spring 45 produces basic friction which acts both in the idling range and in the load range.

One of the two lateral discs 21 and 23, the lateral disc 21 in this embodiment, has an opening 47 which is concentric to the axis of rotation and, in the present case, is limited by an axially set-out flange 49. The flange 49 serves to rigidify the lateral disc 21 and to enlarge the contact areas of spring tongues 51 which project axially from the hub 5 and engage in the central opening 47 in the lateral disc 21. The inherently elastic spring tongues 51 rest on the central opening 47 under radially outward tension due to prestessing and center the lateral disc 21 relative to the hub 5. All other components of the clutch plate 1 which are rotatable relative to the hub 5 are therefore centered relative to the axis of rotation 3 via the lateral disc 21. The hub 5 including the spring tongues 51 and the teeth 9 is designed as a plastics moulding. An integral embodiment of this type may be produced particularly economically. It goes without saying that the flange 49 may optionally be dispensed with.

Variations of hubs which may be used in the clutch plate according to FIG. 1 are described hereinafter. Identically acting parts are designated by the same reference numerals from FIG. 1 and are distinguished by a letter. Reference is made to the description of FIG. 1 for explanation.

Figure 2:
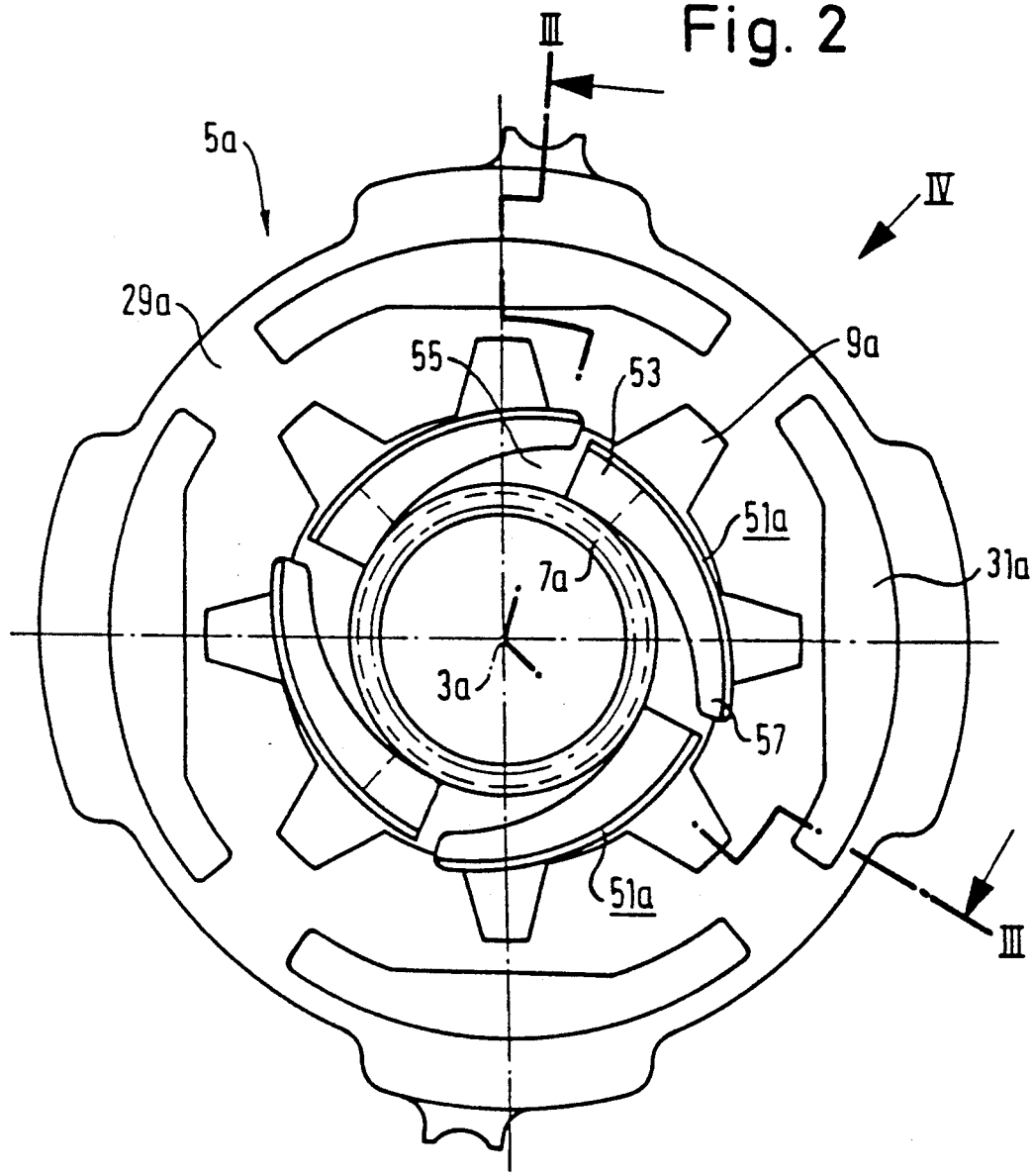
FIG. 2 is an enlarged front view of a hub of the clutch plate.
Figure 3:
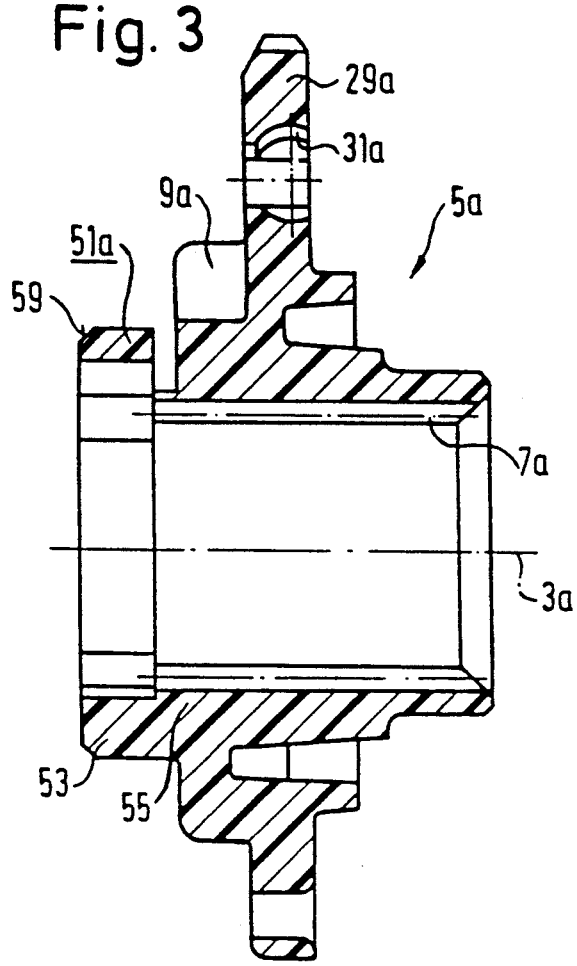
FIG. 3 is a section of the hub as viewed along a line III—III in FIG. 2.
Figure 4:
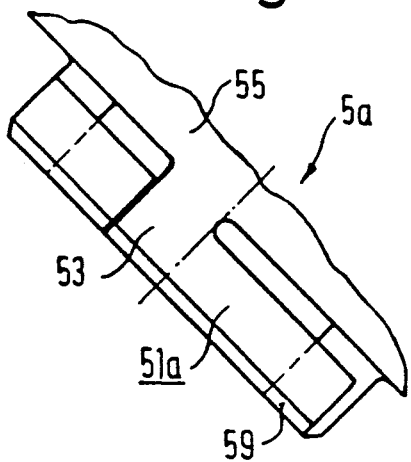
FIG. 4 a partial view of a spring tongue of the hub as viewed in the direction of an arrow IV in FIG. 2.

FIGS. 2 to 4 show a hub 5a of which the spring tongues 51a extend peripherally and are rigidly connected at one end 53 to a substantially sleeve-shaped hub body 55 of the hub 5a while the other, free end 57 is utilized to center the lateral disc 21. The resilient end regions 57 of the spring tongues 51a define, in the non-installed state shown in FIG. 2, a circumference which is concentric to the axis of rotation 3a and is greater than the circumference defined by the foot ends 53 rigidly connected to the hub body 55. The circumference diameter of the ends 53 is smaller than the internal diameter of the central opening 47 in the lateral disc 21. The ends 53 also engaging in the central opening 47 (FIG. 1) of the lateral disc 21 therefore form stops which limit the radial spring travel of the spring tongues 51a and protect the spring tongues 51a from overloading. The stops or ends 53 limit the maximum radial deflection of the lateral discs 21 and 23 relative to the hub 5a. As shown in FIGS. 2 to 4, the spring tongues 51a are provided, at their axially as well as radially outer edges, with inserting bevels 59 which substantially simplify the assembly of the lateral disc 21 and the hub 5a since they simplify the squeezing of the spring tongues 51a, which, in the unassembled state, are located on a circumference of greater diameter than the diameter of the central opening 47 into the central opening 47 of the lateral disc 21.

In contrast to the hub in FIG. 1, not only are the spring tongues 51a and the teeth 9a, intended for coupling to the hub disc 11, an integral constituent of the plastics shaped part, but also the hub disc 29a of the idling vibration damper, in the hub 5a.

Figure 5:
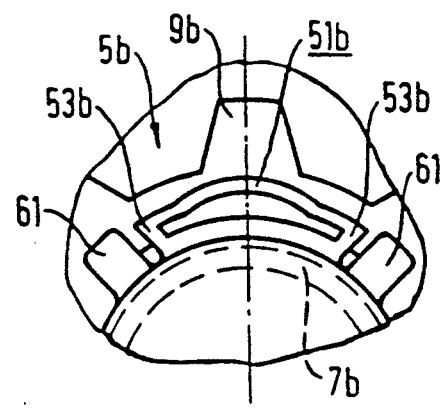
FIG. 5 is a detailed view of a variation of a spring tongue.

FIG. 5 shows a detail of variation of the hub shown in FIG. 2 in which spring tongues 51b extending in a peripherally elongated manner are held integrally on the hub 5b at both ends 53b. The spring tongues 51b are radially outwardly curved in their central region located between the ends 53b and are radially resilient in design here. Peripherally spaced from and between the ends 53b of adjacent spring tongues 51b, stops 61 are shaped on the hub 5b designed as an integrally-shaped plastic part. The stops 61 in turn define a smaller circumcircle diameter, or diameter of circumference than the internal diameter of the central opening 47 of the lateral disc 21 so that the stops limit the spring travel in the above-described manner. As the stops 61 are provided separately from the spring tongues 51b, functional separation may be achieved, allowing the stops 61 to be optimized independently of the spring tongues 51b. It goes without saying that the stops 61 do not have to form absolutely rigid stops since they are produced from plastics material, but can form cushions which are also resilient to a limited extent, depending on the elasticity of the material used.

Figure 6:
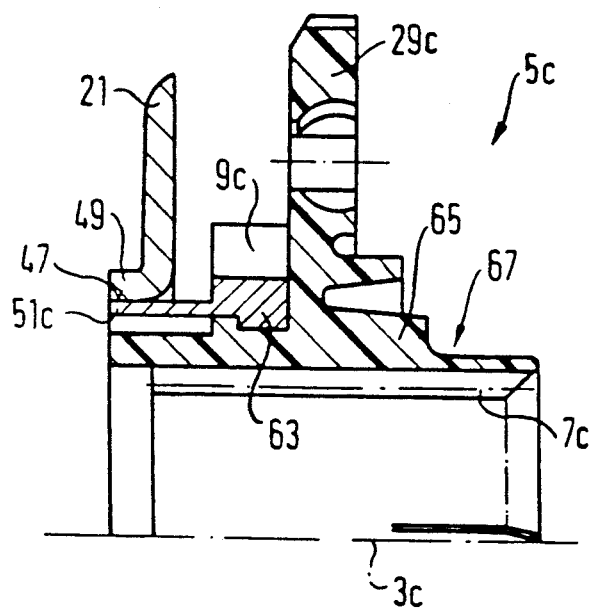
FIG. 6 is a partial section through a hub of a composite moulding design.

FIG. 6 shows a variation of a hub 5c which is designed as a composite moulding and has a tooth part 63 which is produced from metal, and on which hub a plastics moulding 67 surrounding the hub flange 29c and a sleeve part 65 carrying the internal teeth 7c is moulded. The teeth to be coupled to the hub disc 11 and axially projecting spring tongues 51c are shaped integrally on the tooth part 63. The production of the hub 5c as a composite part has the advantage that problems of strength do not arise in the region of the teeth 9c under high stress. Furthermore, the teeth may be very compact in design in such a case. At the same time, the resilient properties of the metal are utilised for the spring tongues 51c. The lateral disc 21 may be mounted directly on the external periphery of the spring tongues 51c with the central opening 47 of its flange 49.

While specific embodiments of the invention have been shown and described in detail to illustrate the application of the inventive principles, it will be understood that the invention may be embodied otherwise without departing from such principles.

What we claim is:

1. A clutch plate for a motor vehicle friction clutch, comprising:
   a hub which is concentric to an axis of rotation and having a guide region;
   a plurality of radially resilient spring tongues carried by the guide region of the hub, said tongues being distributed in peripheral direction of the hub and rigidly connected to the hub;
   stops located on the hub in the region of the spring tongues;
   a hub disc which is connected with limited rotational play to the hub;
   lateral discs arranged axially on either side of the hub disc and rigidly connected to one another, said lateral discs being rotatable relative to the hub disc, at least one lateral disc having a central opening into which the guide region of the hub extends axially, said guide region being concentric to the axis of rotation and radially guiding said lateral disc having a central opening;
   a plurality of springs torsionally and elastically coupling the lateral discs to the hub disc; and
   clutch friction linings held on said lateral disc having a central opening;
   wherein the spring tongues extend into the central opening of said lateral disc having a central opening and rest in the central opening under radial tension on said lateral disc having said central opening, the stops extend into the central opening of said lateral disc having a central opening, the stops being radially substantially rigid and having a radially outer contour diameter which is smaller than the internal diameter of the central opening, and the stops limiting the radial resilient travel of said lateral disc having a central opening relative to the axis of rotation of the hub.

2. The clutch plate as in claim 1, wherein the stops are part of the spring tongues.

3. The clutch plate as in claim 2, wherein the spring tongues have, at least at one end, a foot region which is rigidly integrally connected to the hub and forms the stops.

4. The clutch plate as in claim 1, wherein the stops are arranged on the hub between and at a distance from peripherally adjacent spring tongues.

5. A clutch plate for a motor vehicle friction clutch, comprising:
   a hub which is concentric to an axis of rotation and having a guide region;
   a plurality of radially resilient spring tongues carried by the guide region of the hub, said tongues being distributed in peripheral direction of the hub and rigidly connected to the hub;
   stops located on the hub in the region of the spring tongues;
   a hub disc which is connected with limited rotational play to the hub;
   lateral discs arranged axially on either side of the hub disc and rigidly connected to one another, said lateral discs being rotatable relative to the hub disc, at least one lateral disc having a central opening into which the guide region of the hub extends axially, said guide region being concentric to the axis of rotation and radially guiding said lateral disc having a central opening;
   a plurality of springs torsionally and elastically coupling the lateral discs to the hub disc; and
   clutch friction linings held on said lateral disc having a central opening;
   wherein the spring tongues are elongated in the peripheral direction of the hub and are bent in the form of an arc centered around the axis of rotation, the spring tongues extend into the central opening of said lateral disc having a central opening and rest in the central opening under radial tension on said lateral disc having said central opening, both ends of the spring tongues are rigidly connected to the hub, and the spring tongues are radially resiliently and radially outwardly curved in their central region between the ends.

6. A clutch plate for a motor vehicle friction clutch, comprising:
   a hub which is concentric to an axis of rotation and having a guide region;
   a plurality of radially resilient spring tongues carried by the guide region of the hub, said tongues being distributed in peripheral direction of the hub and rigidly connected to the hub;
   stops located on the hub in the region of the spring tongues;
   a first hub disc which is connected with limited rotational play to the hub;
   a set of teeth which couples the first hub disc with limited rotational play to the hub and is arranged on the periphery of the hub;
   a second hub disc rigidly arranged axially next to the set of teeth for an idling torsional vibration damper;
   lateral discs arranged axially on either side of the first hub disc and rigidly connected to one another, said lateral discs being rotatable relative to the first hub disc, at least one lateral disc having a central opening into which the guide region of the hub extends axially, said guide region being concentric to the axis of rotation and radially guiding said lateral disc having a central opening;
   a plurality of springs torsionally and elastically coupling the lateral discs to the first hub disc; and clutch friction linings held on said lateral disc having a central opening;

wherein the spring tongues extend into the central opening of said lateral disc having a central opening and rest in the central opening under radial tension on said lateral disc having said central opening, and the hub, including the spring tongues, the set of teeth which couples the first hub disc with limited rotational play to the hub and is arranged on the periphery of the hub, and the second hub disc rigidly arranged axially next to the set of teeth for an idling torsional vibration damper, is designed integrally as a plastics shaped part.

7. A clutch plate for a motor vehicle friction clutch, comprising:

a hub which is concentric to an axis of rotation and having a guide region;

a plurality of radially resilient spring tongues carried by the guide region of hub, said tongues being distributed in peripheral direction of the hub and rigidly connected to the hub;

stops located on the hub, in the region of the spring tongues;

a first hub disc which is connected with limited rotational play to the hub;

at least one set of teeth which couples the first hub disc with limited rotational play to the hub;

a second hub disc rigidly arranged axially next to the set of teeth for an idling torsional vibration damper;

lateral discs arranged axially on either side of the first hub disc and rigidly connected to one another, said lateral discs being rotatable relative to the first hub disc, at least one lateral disc having a central opening into which the guide region of the hub extends axially, said guide region being concentric to the axis of rotation and radially guiding said lateral disc having a central opening;

a plurality of springs torsionally and elastically coupling the lateral discs to the first hub disc; and clutch friction linings held on said lateral disc having a central opening;

wherein the spring tongues extend into the central opening of said lateral disc having a central opening and rest in the central opening under radial tension on said lateral disc having said central opening, and the hub is designed as a composite moulding consisting of a plastics shaped part and a metallic shaped part, the metallic shaped part having at least one set of external teeth coupling the first hub disc with limited rotational play to the hub, and the plastics shaped part having at least one sleeve part provided with a set of internal teeth and the second hub disc for an idling torsional vibration damper rigidly arranged axially next to the set of external teeth of the metallic shaped part.

8. The clutch plate as in claim 7, wherein the spring tongues are shaped on the metal shaped part and are provided on the side of the set of external teeth axially removed from the further hub disc.

* * * * *

UNITED STATES PATENT AND TRADEMARK OFFICE
CERTIFICATE OF CORRECTION

PATENT NO. : 5,251,736
DATED : October 12, 1993
INVENTOR(S) : Harald Jeppe et al.

It is certified that error appears in the above-identified patent and that said Letters Patent is hereby corrected as shown below:

```
On title page, item [75], third line "Schweinfurt" should read
--Grafenrheinfeld--;
Col. 1, line 56, "designed" should read -- are designed--;
Col. 2, line 3, "spring" should read --spring tongues,--;
Col. 2, line 28, "are" should read --is--;
Col. 2, line 29, "radially, free" should read --radially free--;
Col. 2, line 33, delete "with";
Col. 3, line 9, "FIG. 4" should read --FIG. 4 is--;
Col. 4, line 49, "an integral constituent" should read --integral
constituents--;
Col. 4, line 61, "plastic" should read --plastics--;
Col. 4, lines 61-62, "circumcircle" should read --circumference--;
Col. 7, line 20, "hub" should read --said hub--.
```

Signed and Sealed this

Twenty-sixth Day of July, 1994

Attest:

BRUCE LEHMAN

*Attesting Officer*   *Commissioner of Patents and Trademarks*